Patented Oct. 16, 1928.

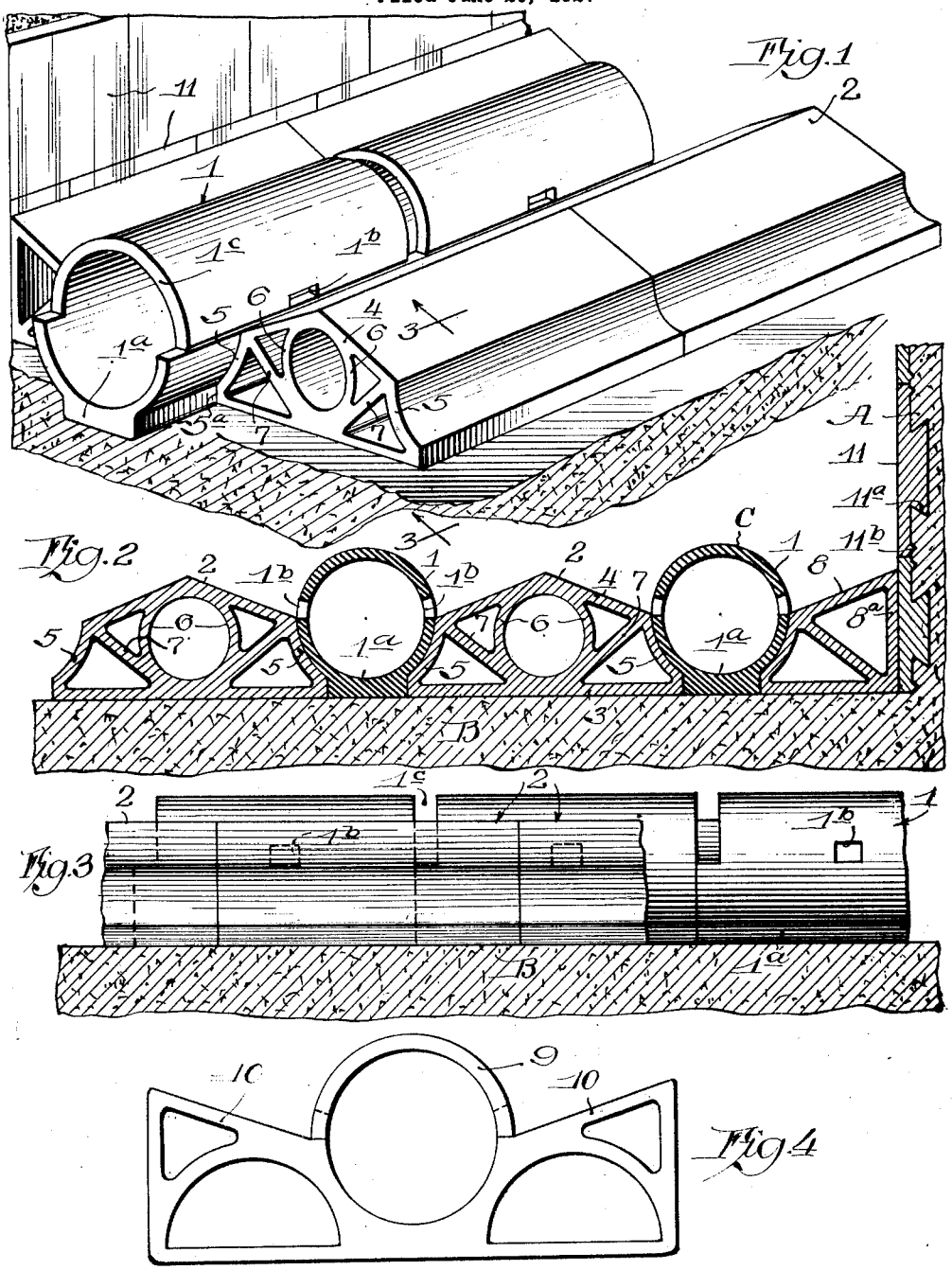

1,687,782

UNITED STATES PATENT OFFICE.

JOHN M. NORTON, OF FORT DODGE, IOWA, ASSIGNOR TO PLYMOUTH CLAY PRODUCTS COMPANY, OF FORT DODGE, IOWA, A CORPORATION OF IOWA.

FLOOR BLOCK FOR DISPOSAL TANKS.

Application filed June 20, 1927. Serial No. 200,006.

This invention relates to improvements in floor tiles for disposal tanks, and more particularly to a construction for the floors and walls of tanks or receptacles for the treatment of sewage and the like.

The object of the invention is to provide a construction for tanks of the character described, in which the surface of the tank floor as well as the walls are surfaced with tile thereby eliminating the use of concrete other than as a foundation for the floors and walls, since concrete deteriorates rapidly when exposed to sewage, due to destructive chemical action of the acids contained therein.

A further object of the invention is to provide a novel construction for blocks for filter beds, calculated to be light in weight and designed to afford ample strength to support the filter bed and to give the proper floor contour between the conduits laid on the floor foundation.

A preferred embodiment of the invention is disclosed in the accompanying drawings, in which Figure 1 is a general view in perspective of a section of the floor of a disposal tank.

Figure 2 is a view in cross-section through the floor of a disposal tank showing the manner in which the conduits and blocks are laid.

Figure 3 is a view in vertical section taken longitudinally of a row of blocks, as on line 3—3 of Figure 1; and Figure 4 is a view in end elevation of a modified construction for a floor block having a conduit section formed integral therewith.

As clearly shown in Figure 2, a tank for liquid filtration or sewage disposal comprises in general an open reservoir excavated below the level of the ground or erected above the ground level, as conditions permit, the sides and bottom of the tank being constructed of concrete or masonry walls A and floor foundation B. Laid upon the floor foundation is the floor proper consisting of conduits C extending parallel throughout the length or width of the tank and discharging exterior thereto and intermediate rows or courses of hollow floor tile D. Above the floor are layers of loose filtering material (not shown), the coarser materials being usually at the bottom and gradually becoming finer near the top of the tank.

A common method of preparing the floor of sewage disposal tanks is to lay the conduits C upon a concrete floor foundation and then fill in the spaces between the conduits with additional concrete to substantially one-half the height of the conduits so that they are partially embedded. This method, however, is not wholly satisfactory, for the reasons already pointed out, namely, that in time the acids which are present in the sewage will attack the exposed concrete with the attendant necessity of frequent reconstruction and renewal.

The present invention contemplates the use of conduits, in this instance being cylindric pipe sections 1, made of vitrified clay. Each pipe section is provided with a flattened base portion or foot $1^a$ on which the section rests on the floor foundation, the same being formed by increasing the thickness of a portion of the wall of the pipe section and providing that portion with a flat bottom and straight sides or shoulders at right angles to the bottom face, as shown in Figure 1. On each side of the pipe section and midway between its ends, are laterally facing rectangular openings $1^b$—$1^b$ so located that their lower edges are at the same level and approximately one-half the height of the pipe section. At one end of each section is a semi-circular recess $1^c$ extending throughout the upper half thereof, these recesses forming upwardly opening semi-circular slots when the recessed end of one section is laid in abutting contact with the straight or plain end of the adjacent section.

A conduit constructed of pipe sections such as herein shown and described, has been previously disclosed in an application filed by Clare H. Currie on February 19, 1926, Serial No. 89,450, and it is a pipe section of this form that I prefer to employ, although any similar form of conduit which can be laid in sections may be used equally well in the construction of disposal tanks embodying my invention.

For the purpose of the present disclosure, it may be assumed that the walls and floor foundation are of concrete, poured into forms in accordance with the common practice, and upon the floor foundation A is laid the floor consisting of alternate rows of pipe sections 1 and floor blocks 2, the same being of a convenient length for laying, say eighteen or twenty-four inches, although the pipe sections and blocks may not be of the same length.

Referring to the preferred form of block as shown in Figure 1, the same are preferably made of the same material as the pipe sections, namely, clay with a vitrified surface. The blocks are of a hollow reinforced or arched construction, and consist of external and internal walls moulded or cast integral with each other. The external walls consist of a bottom wall 3, a beveled or arched top wall 4 inclined downwardly from the center toward the ends, and inwardly curved end walls 5—5 with square shoulders 5ª at the junction of said end walls and bottom wall. At the center of the block are curvilinear wall segments 6—6 joining the top and bottom walls and forming a centrally located circular passage extending longitudinally of the the block. From the central portion of the bottom wall 3 are diagonal walls 7—7 extending laterally and upwardly to the junction of the top wall 4 and side walls 5—5.

As clearly shown in Figure 2, the blocks 2 are dimensioned to fit between pipe sections 1 of a predetermined size and form, also for a given distance between the center lines of the conduits. Thus assuming that the pipe sections are six inches inside diameter and laid on 18 inch centers, the blocks are made to fit snugly between the rows of pipe sections to conform with the given spacing and also to provide the required contour of the drainage surface therebetween. Thus the height of the blocks at their center is slightly more than one-half the height of the pipe sections and taper downwardly on either side so that the outer edges of the top wall coincide with the bottom edges of the side openings 1ᵇ in said pipe sections. Likewise, the curved side walls 5—5 are arcs of circles taken about the centers of the pipe sections with due allowance for the thickness of the sections and a slight clearance. So too, the shoulders 5ª fit into the shoulders along the sides of the base or foot 1ª of the pipe sections. The walls of the pipe sections and blocks are preferably of equal thickness of say one-half inch, this being sufficient for hollow tiling for this type of work.

The pipe sections 1 and blocks 2 are laid on the floor foundation in any convenient manner, the work progressing with respect to the line of the conduit. It is customary, however, to space the endmost conduits from the adjacent walls of the tank and for that reason a row of half blocks 8 are laid along the sides of the floor for the first course. These half blocks are simply half portions of a whole block, with straight end walls 8ª replacing the curved center reinforcing walls 5—5 of the whole blocks and otherwise slightly modified to bring about the alteration.

As thus laid, the blocks 2 form arched or crowned drainage surfaces dividing the flow toward the conduits between which they are placed, and the half blocks directing the flow from the side walls toward the adjacent conduits. Above the floor thus laid is the filter bed consisting of the loose material hereinbefore referred to.

As a modified construction for sectional tile for tank floors, it is possible to cast or mold the pipe sections and floor blocks integral, as shown in Figure 4. In this form the pipe section becomes the central portion 9 of the combination tile with a half-block section 10 on either side, this being substantially the equivalent of combining a single pipe section 1 with two half blocks 8—8 into an integral member, replacing the abutting double wall portions with single walls of slightly increased thickness to give the additional strength where needed. The cross-sectional contour of the combination tile differs somewhat in the arrangement of the internal supporting wall segments, but it is not thought necessary to mention them in detail as they are readily apparent from the drawing.

As for laying the combination tiles of Figure 4, practically the only difference would be that the longitudinal parting lines would extend midway between the conduits and along the ridge of the crowned drainage surface instead of along the sides of the conduits.

To complete the all-tile surface of the disposal tank, it is preferable to line the side walls with flat tiles 11 of vitrified clay. These tiles are rectangular in shape, of say 12 or 18 inches square and one inch in thickness. On the back of each tile is a wide rib 11ª with inwardly converging side edges so that a dovetail joint is formed with the concrete wall in which these tiles are embedded. Narrow pointed ribs 11ᵇ are also provided along the edges of the tile extending parallel with the central rib 11ª and on the rear face thereof.

I claim as my invention:

1. A disposal tank or the like having a floor of hollow tile members adapted to be laid end to end in abutting rows and comprising cylindric pipe sections forming parallel conduits and floor blocks having their top surfaces inclined downwardly on opposite sides toward and meeting said pipe sections substantially midway their height.

2. In a disposal tank or the like the combination with a floor foundation of hollow tile members laid thereon and comprising rows of pipe sections abutting at their ends and blocks between said rows of pipe sections, said blocks having a flat bottom wall, an arched top wall and concave end walls adapted to embrace said pipe sections.

3. In a disposal tank or the like having a floor foundation of cementitious construction, the combination of alternate rows of pipe and block sections of hollow tile construction abutting end to end, said block sections having arched top wall and concave end walls adapted to embrace the lower portions of said pipe sections.

4. A disposal tank or the like having a floor comprising parallel conduits and blocks laid end to end between said conduits, said blocks comprising an arched top wall sloping in opposite directions toward said conduits, and concave side walls abutting the lower half portions of said conduits.

Signed at Ft. Dodge, Ia., this 16th day of June, 1927.

JOHN M. NORTON.